United States Patent [19]

Harper, III

[11] Patent Number: 5,367,876
[45] Date of Patent: Nov. 29, 1994

[54] APPARATUS FOR CONTROLLING OF AUTOMOTIVE EXHAUST EMISSIONS BY TREATMENT OF EXHAUSTING GASES TRAVELING THROUGH AN AUTOMOTIVE EXHAUST CONDUIT

[76] Inventor: Raymond F. Harper, III, 137-B Garden Ave., Browns Mills, N.J. 08015

[21] Appl. No.: 862,118

[22] Filed: Apr. 2, 1992

[51] Int. Cl.$^5$ ............................................. F01N 3/04
[52] U.S. Cl. ............................ 60/310; 55/220; 55/227; 55/DIG. 30
[58] Field of Search .............. 60/310; 55/220, 227, 55/DIG. 30

[56] References Cited

U.S. PATENT DOCUMENTS

| | | | |
|---|---|---|---|
| 887,988 | 5/1908 | Wakley | 60/310 |
| 2,918,789 | 12/1959 | Sivesind et al. | |
| 2,932,364 | 4/1960 | Binter | |
| 3,282,047 | 11/1966 | Wertheimer | 60/310 |
| 3,503,704 | 3/1970 | Marks | |
| 3,599,427 | 8/1971 | Jones | |
| 3,633,343 | 1/1972 | Mark | 60/310 |
| 3,738,085 | 6/1973 | Nishinomiya | 60/310 |
| 3,754,074 | 8/1973 | Grantham | |
| 3,788,042 | 1/1974 | Yuen | 60/310 |
| 4,665,690 | 5/1987 | Nomoto et al. | |

Primary Examiner—Douglas Hart
Attorney, Agent, or Firm—Sperry, Zoda & Kane

[57] ABSTRACT

An apparatus for controlling automotive emissions by treating of the exhaust gases with treatment chemicals such as cyanuric acid, alcohol, pulverized limestone and/or tetradecylpyridinium bromide. The apparatus for treatment includes a reservoir affixed to an automobile such as in the trunk adapted to receive the fluid chemicals therein and the reservoir conduit for carrying the treatment chemicals to a fluid pump. The fluid pump device is adapted to transfer the fluid chemicals through a pump conduit to an injector housing device which includes an interior plenum chamber for receiving of the liquid chemicals therein. The injector housing includes an outlet with injector members positioned therein for dispersing of the fluid outwardly from the injector housing. The injector housing is designed to be positioned in abutment with respect to an exhaust conduit such as an automotive tailpipe with the injector member extending therefrom through an aperture in the exhaust conduit into the interior for direct access to the exhaust gases traveling therethrough. The desired chemicals are then dispensed through the injector into these exhaust gases for control of pollutants therein.

19 Claims, 2 Drawing Sheets

APPARATUS FOR CONTROLLING OF AUTOMOTIVE EXHAUST EMISSIONS BY TREATMENT OF EXHAUSTING GASES TRAVELING THROUGH AN AUTOMOTIVE EXHAUST CONDUIT

BACKGROUND OF THE INVENTION

1. Field Of The Invention

The present invention deals with the field of devices for controlling of pollution and specifically for controlling of pollution caused by automobile applications. The apparatus of the present invention deals with devices designed for attachment to an automobile which can be utilized to treat the automotive pollutants as well as for being expelled into the atmosphere to treat atmospheric pollutants also. This present device deals with apparatus adapted to dispense treatment chemicals directly into exhaust gases traveling through an exhaust conduit of and automotive application.

2. Description Of The Prior Art

Numerous prior art devices have been patented on processes and apparatus for treatment of internal combustion engine exhaust gases such as U.S. Pat. No. 2,918,789 patented Dec. 29, 1959 to H. Sivesind et al on an Apparatus For Deodorizing Exhaust Gases From Internal Combustion Engines; U.S. Pat. No. 2,932,364 patented Apr. 12, 1960 to F. Binter on a Method For Treatment Of Exhaust Gases From Internal Combustion; U.S. Pat. No. 3,503,704 patented Mar. 31, 1970 to A. Marks on a Method And Apparatus For Suppressing Fumes With Charged Aerosols; U.S. Pat. No. 3,599,427 patented Aug. 17, 1971 to J. Jones et al on an Exhaust Gas Purification; U.S. Pat. No. 3,738,085 patented Jun. 12, 1973 to T. Nishinomiya on a Device For The Removal Of Detrimental Matter From Exhaust Gases Of Internal Combustion Engines; U.S. Pat. No. 3,754,074 patented Aug. 21, 1973 to L. Grantham on Removal Of Nitrogen Oxides And Other Impurities From Gaseous Mixtures and U.S. Pat. No. 4,665,690 patented May 19, 1987 to Y. Nomoto et al on an Exhaust Gas Cleaning System For Vehicle.

SUMMARY OF THE INVENTION

The present invention provides an apparatus for controlling automotive exhaust emissions by treating of the exhaust gases traveling through an automotive exhaust conduit such as a tailpipe or the like. A plurality of treatment chemicals which are designed for controlling automotive emissions are placed within a fluid reservoir means secured with respect to an automobile. The fluid reservoir will normally be positioned in the trunk to facilitate direct access thereto. The chemicals placed within the fluid reservoir will normally include cyanuric acid for control of auto pollutions and hydrocarbons and the added benefit of control of chlorine oxides in the atmosphere. An alcohol design will be utilized also to prevent similar pollutions and minimize atmosphere freezing and pulverized limestone is also preferably added for neutralization of sulfuric oxides, nitrogen oxides and carbon dioxides and having the side benefit of minimizing acid rain. In automotive diesel exhaust applications tetradecylpyridinium bromide will also be included for specific control of these exhaust pollutants.

The fluid reservoir preferably includes a fluid reservoir outlet adapted to facilitate exiting of these treatment chemicals from the interior chamber thereof for direct application to the automotive exhaust emissions. The fluid reservoir further preferably defines a fluid reservoir inlet to facilitate filling of the interior chamber of the fluid reservoir with treatment chemicals as desired. A cover means may be included extending over the fluid reservoir inlet means for sealing thereof as desired.

A reservoir conduit may be attached with respect to the fluid reservoir outlet to be in fluid flow communication with respect to the interior chamber and to be adapted to receive treatment chemicals exiting therefrom. A fluid pump is preferably further included having a fluid pump inlet and a fluid pump outlet. The fluid pump inlet is attached with respect to the reservoir conduit to facilitate pumping of treatment chemicals therefrom and thus from the interior of the fluid reservoir.

A pump conduit is positioned attached with respect to the fluid pump outlet and is adapted to receive treatment chemicals passing therefrom.

An injector housing may be included defining therein an interior plenum chamber adapted to receive treatment chemicals to facilitate dispensing. The injector housing may define an injector inlet and an injector outlet to facilitate passing of the treatment chemicals therethrough. The injector inlet is attached with respect to the pump conduit to establish fluid flow communication between the injector plenum chamber and the fluid pump for receiving of treatment chemicals under pressure therefrom through the pump conduit.

An injector may be attached with respect to the injector housing at the injector outlet thereon such as to extend outwardly from the injector outlet and into the automotive exhaust conduit for facilitating dispensing of treatment chemicals directly into the automotive exhaust gases traveling therethrough.

In a preferred configuration the injector housing includes a first injector housing positioned adjacent the automotive exhaust conduit to facilitate treatment of exhaust gases traveling therein. This first injector housing also defines a first injector inlet and a first injector outlet with the inlet being in fluid flow communication with respect to the pump conduit to receive the treatment chemicals therefrom. In a similar fashion the injector housing means may also include a second injector housing positioned adjacent an automotive exhaust conduit to facilitate treatment of exhaust gases traveling therein. This second injector housing may define a second injector inlet and a second injector outlet. The second injector inlet of the second injector housing is positioned to be in fluid flow communication with respect to the pump conduit means to receive the treatment chemicals therefrom.

In a preferred configuration the pump conduit means will include a y-shaped conduit connector with an upstream pump conduit extending from the fluid pump means to the y-shaped connector. Also a first downstream pump conduit will extend from the y-shaped conduit connector to the first injector housing to facilitate fluid flow communication between the fluid pump and the first injector housing. Similarly a second downstream pump conduit will extend from the y-shaped conduit connector to the second injector housing to facilitate fluid flow communication between the fluid pump and the second injector housing.

The injector means of the present invention when utilized with the multiple injector housings can also include a first injector device positioned in the outlet of the first injector housing and a second injector device positioned in the outlet of the second injector housing to facilitate complete and efficient treatment of exhausting gases by the treatment chemicals dispersed thereby.

To facilitate securement of the injector with respect to the exhaust conduits an injector securement means may be included which utilizes a clamping strap extending about both the exhaust conduit and the injector housing. A laterally extending tab can extend outwardly from the injector housing with a vertically extending tab means at the outermost end thereof to facilitate firm and fixed securement of the exhaust conduit with respect to the injector housing by the injector securement means.

It is an object of the present invention to provide an apparatus for controlling of automotive exhaust emissions by treatment of exhausting gases traveling through an automotive exhaust conduit wherein automotive exhaust emissions are minimized.

It is an object of the present invention to provide an apparatus for controlling of automotive exhaust emissions by treatment of exhausting gases traveling through an automotive exhaust conduit wherein sulphur oxides, nitrogen oxides and carbon dioxides are minimized in automotive exhaust.

It is an object of the present invention to provide an apparatus for controlling of automotive exhaust emissions by treatment of exhausting gases traveling through an automotive exhaust conduit wherein pollutants normally attributable to diesel exhaust emissions are minimized.

It is an object of the present invention to provide an apparatus for controlling of automotive exhaust emissions by treatment of exhausting gases traveling through an automotive exhaust conduit wherein initial capital outlay for equipment is minimized.

It is an object of the present invention to provide an apparatus for controlling of automotive exhaust emissions by treatment of exhausting gases traveling through an automotive exhaust conduit wherein treatment chemicals are utilized which are inexpensive.

It is an object of the present invention to provide an apparatus for controlling of automotive exhaust emissions by treatment of exhausting gases traveling through an automotive exhaust conduit wherein enhancement of the air quality in urban environments is achieved.

It is an object of the present invention to provide an apparatus for controlling of automotive exhaust emissions by treatment of exhausting gases traveling through an automotive exhaust conduit wherein only one moving part is utilized.

It is an object of the present invention to provide an apparatus for controlling of automotive exhaust emissions by treatment of exhausting gases traveling through an automotive exhaust conduit wherein maintenance costs are minimized.

It is an object of the present invention to provide an apparatus for controlling of automotive exhaust emissions by treatment of exhausting gases traveling through an automotive exhaust conduit wherein after market application by purchase automotive stores is facilitated.

It is an object of the present invention to provide an apparatus for controlling of automotive exhaust emissions by treatment of exhausting gases traveling through an automotive exhaust conduit wherein apparatus installation is easy and convenient.

It is an object of the present invention to provide an apparatus for controlling of automotive exhaust emissions by treatment of exhausting gases traveling through an automotive exhaust conduit wherein utilization on trucks, buses, boats and even motorcycles is achievable.

It is an object of the present invention to provide an apparatus for controlling of automotive exhaust emissions by treatment of exhausting gases traveling through an automotive exhaust conduit wherein no components are positioned within the engine auto compartment of an automotive vehicle.

It is an object of the present invention to provide an apparatus for controlling of automotive exhaust emissions by treatment of exhausting gases traveling through an automotive exhaust conduit wherein excess treatment chemicals can reduce pollution which is already airborne.

It is an object of the present invention to provide an apparatus for controlling of automotive exhaust emissions by treatment of exhausting gases traveling through an automotive exhaust conduit wherein chemical repair of the depleted ozone layer is facilitated.

It is an object of the present invention to provide an apparatus for controlling of automotive exhaust emissions by treatment of exhausting gases traveling through an automotive exhaust conduit wherein operation is automatically achieved whenever the engine is running.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
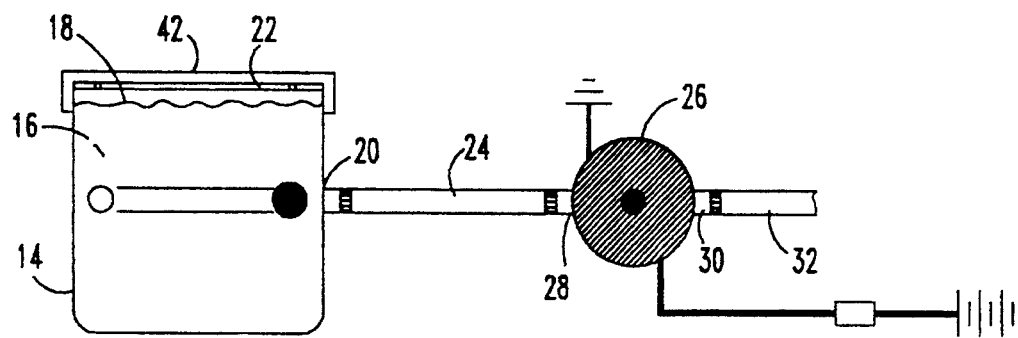
FIG. 1 is a schematic illustration of an embodiment of the fluid reservoir, reservoir conduit, fluid pump and pump conduit of an embodiment of the present invention.

The present invention provides an apparatus which is designed for controlling of exhaust emissions from automotive applications. Such automotive exhaust emissions should be treated prior to exhausting into the environment to minimize the pollutants therein. The present invention provides a means for treating of this exhaust with a plurality of treatment chemicals in fluid form for controlling pollution primarily in the automotive exhaust. As a side benefit, however, the chemicals utilized in the treatment of these automotive exhausts will also provide supplementary treatment of pollution which is already in the environment as these treatment chemicals are carried into the environment by the automotive exhaust assembly.

The treatment chemicals include pulverized limestone which is adapted to neutralize sulfuric dioxides, nitrogen dioxides, carbon dioxides and various acids to minimize the presence of these pollutions in the atmosphere and primarily in the automotive exhaust and to minimize acid rain. Cyanuric acid is utilized to minimize chlorine dioxides as well as the automotive pollutions and hydrocarbons and to minimize depletion of the ozone layer by other pollutants. Alcohol may be added as a treatment chemical to minimize atmospheric freezing. Tetradecylpyridinium bromide is useful for controlling exhaust emissions normally associated with internal combustion diesel emissions.

In conventional automotive applications an automotive exhaust conduit 10 will be included normally tubular in shape with exhaust gases 12 traveling therealong. The present invention is designed for the treatment of these exhausting gases 12 with chemical fluids which are designed to be retained within a fluid reservoir means 14. The fluid reservoir preferably will be secured within the trunk area of a conventional automobile to facilitate access thereto and to maintain spacing thereof from the automotive engine.

The fluid reservoir 14 preferably defines an interior chamber 16 defined to hold the treatment chemicals 18 therein. Fluid reservoir 14 defines a fluid reservoir inlet 22 adapted to receive fluid treatment chemicals 18 for placement into the interior chamber 16. This fluid reservoir inlet 22 may be closed by the positioned of a cover means 42 thereover as desired.

The fluid reservoir means 14 also defines a fluid reservoir outlet means 20 therein adapted to provide a supply of treatment chemicals 18 to a reservoir conduit means 24 extending therefrom. Reservoir conduit means 24 is adapted to be in fluid flow communication with respect to a fluid pump means 26. Fluid pump means 26 may take the form of a conventional electric-type fuel pump but can be any type of pump capable of being powered such as to place fluid under pressure.

The fluid pump means 26 includes a fluid pump inlet 28 which is attached with respect to the reservoir conduit 24. Fluid pump means 26 further includes a fluid pump outlet 30 adapted to supply treatment chemicals 18 under pressure moving outwardly therethrough.

A pump conduit means 32 may be secured with respect to the fluid pump outlet 30 of fluid pump means 26 to receive treatment chemicals 18 under pressure therefrom. The pump conduit 32 is adapted to carry treatment chemicals 18 to an injector housing means 34.

The injector housing means 34 is adapted to be secured with respect to the exhaust conduit 10 in order to facilitate transfer of treatment chemicals 18 therefrom into the interior of the exhaust conduit 10 to mix with an neutralize the exhaust gases 12.

The injector housing 30 can define an interior plenum chamber 36 therein to act as a temporary storage location for treatment chemicals 18 prior to dispensing thereof into the exhausting gases 12. The injector housing preferably defines an injector inlet means 38 which is in fluid flow communication with respect to the pump conduit means 32 to receive treatment chemicals. The injector housing means 34 may further define an injector outlet means 40 which is preferably positioned adjacent to an aperture defined in the side wall of the automotive exhaust conduit 10. Outlet 40 of the injector housing 34 will then be able to supply treatment chemicals 18 through the aperture in the automotive exhaust conduit 10 for mixing with the exhaust gases 12 traveling therethrough.

Figure 2:
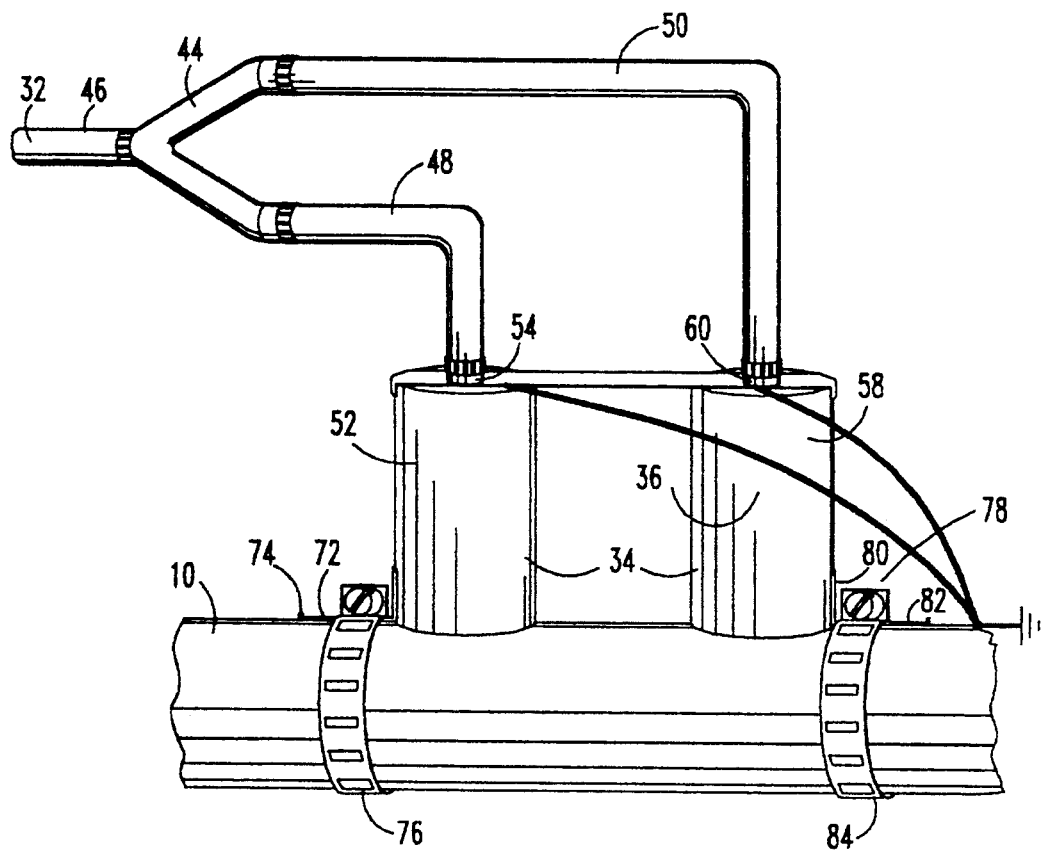
FIG. 2 is a side view of the pump conduit and y pump connector shown used in association with dual injector housings of an embodiment of the present invention.

In an alternative configuration the pump conduit means 32 can include a y-shaped conduit connector 44 for splitting of an upstream pump conduit 46 such that more than one injector housing 34 can be served by the same pump conduit 32. With this configuration the y-shaped conduit connector 44 will be attached with respect to a first downstream pump conduit 48 and a second downstream pump conduit 50 as shown best in FIG. 2. With this configuration a first injector housing 52 and a second injector housing 58 will be preferably utilized. First injector housing 52 will define a first injector inlet means 54 and a first injector outlet means 56. In a similar manner the second injector housing 58 will define a second injector inlet means 60 and a second injector outlet means 62. Each of these injectors will operate similar to the basic injector housing means 34 but will provide multiple points of application of the treatment chemicals 18 to the exhausting gases 12 to facilitate full and complete treatment thereof.

Figure 3:
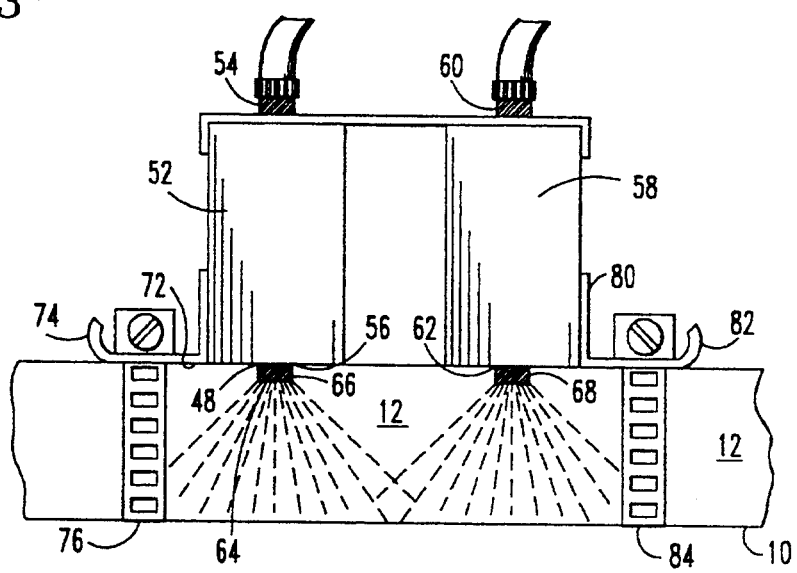
FIG. 3 is a side plan view of dual injector housings shown dispensing chemicals into exhausting gases.
Figure 4:
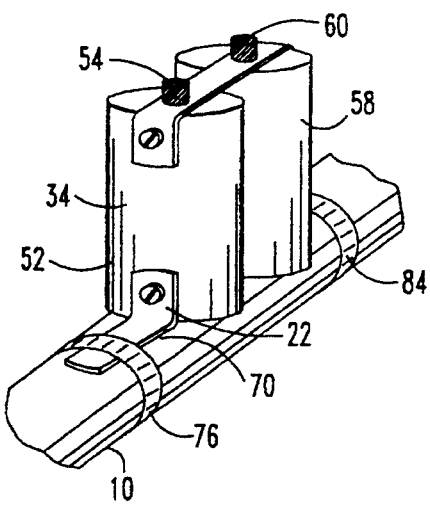
FIG. 4 is a side perspective illustration of an embodiment of the present invention showing dual injector housings mounted upon an exhaust conduit.

Dispersing of the treatment chemicals 18 will be facilitated by the positioning of an injector means 64 in the outlet of the injector housing. With the multiple configuration defines above the injector means 64 will preferably include a first injector device 66 positioned in the first injector outlet means 56 of first injector housing 52. Similarly the injector means 64 will include a second injector device 68 positioned in the second injector outlet means 62 of the second injector housing 58. These injectors will extend through the aperture defined in the automotive exhaust conduit 10 to facilitate dispensing of treatment chemicals 18 into the exhausting gases 12 as best shown in FIG. 3.

Positioning of the injector housing means 34 with respect to the exhaust conduit 10 is achieved by securement means. With the double injector housing configuration this securement means will include a first injector securement means 70 and a second injector securement means 78. First injector securement means 70 will include a first tab means 72 fixedly secured with respect to the first injector housing 52 and extending outwardly therefrom along the exhaust conduit 10 with a first lip means 74 at the outermost end thereof. A first clamping strap 76 will be secured about the first tab means 72 and about the exhaust conduit 10 in such a manner as to secure the first injector housing 52 fixedly with respect to the exhaust conduit 10. The first clamping means 76 is preferably adjustable for variations in the sizes of these equipment and to facilitate application to different types of hardware. In a similar manner the second injector securement means 78 may include a second tab means 80 fixedly secured with respect to the second injector housing 58 and extending outwardly horizontally thereof with a second lip means 82 extending vertically therefrom. A clamping strap 84 may be adjustable and may be positioned about the second tab means 80 in such a manner as to secure the second injector housing 58 with respect to the exhaust conduit 10.

Figure 5:
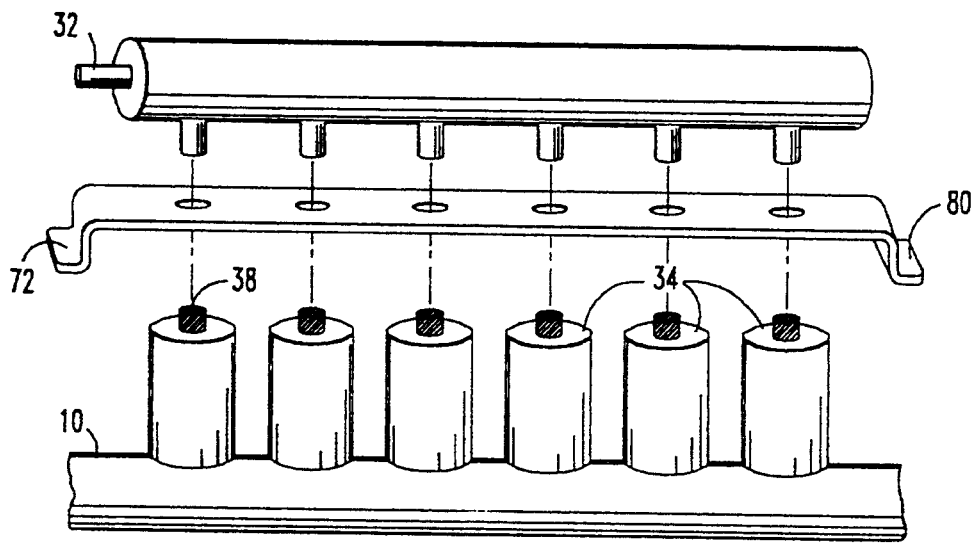
FIG. 5 is a side plan view of a compact embodiment of the pump conduit and injector housings of the present invention.

In the alternative configuration shown in FIG. 5 a chemical distribution log comprises a portion of the downstreammost portion of the pump conduit means 32 and supplies treatment chemicals 18 directly to a series of small injector housings 34. This configuration utilizes one large hold down strap with the securement tabs extending laterally therefrom. This configuration is particularly useful for low profile locations where extremely close spacial tolerances are experienced.

The fluid reservoir 14 as described above is preferably positioned within the trunk of an automobile will normally hold between 5–10 gallons of treatment chemicals 18. The fluid reservoir 14 will preferably be located on the same side of the car as is located the automotive exhaust conduit 10 into which treatment is desired to be placed. The uses of multiple fluid reservoirs is also possible such as with dual exhaust configurations if necessary. The conduits utilized extending from the reservoir and extending from the pump in the present invention preferably are of rubber and can be conventional automotive fuel lines. The fluid pump can also be positioned within the trunk area if necessary or can be secured underneath the trunk and in either manner would provide sufficient pressure for dispensing of the treatment chemicals.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for controlling of automotive exhaust emissions by treatment of exhausting gases traveling through an automotive exhaust conduit comprising:
   A. a plurality of treatment chemicals for controlling automotive exhaust emissions, said treatment chemicals being in fluid form;
   B. a fluid reservoir means secured with respect to an automobile and defining an interior chamber means therein adapted to hold said treatment chemicals therein to facilitate treatment of automotive exhaust emissions as desired, said fluid reservoir means including a fluid reservoir outlet means adapted to facilitate exiting of said treatment chemicals from said interior chamber means for treatment of automotive exhaust emissions, said fluid reservoir means further defining a fluid reservoir inlet means to facilitate filling of said interior chamber means with said treatment chemicals;
   C. a reservoir conduit means attached with respect to said fluid reservoir outlet means to be in fluid flow communication with respect to said interior chamber means and adapted to receive said treatment chemicals exiting therefrom;
   D. a fluid pump means including a fluid pump inlet and a fluid pump outlet, said fluid pump inlet being attached with respect to said reservoir conduit means to facilitate pumping of said treatment chemicals therefrom and from said interior chamber means of said fluid reservoir means;
   E. a pump conduit means attached with respect to said fluid pump outlet and adapted to receive said treatment chemicals passing therethrough;
   F. an injector housing means defining therein an interior plenum chamber adapted to receive said treatment chemicals therein to facilitate dispensing thereof, said injector housing means defining an injector inlet means and an injector outlet means to facilitate passing of said treatment chemicals therethrough, said injector inlet means being attached with respect to said pump conduit means to establish fluid flow communication between said injector plenum chamber and said fluid pump means for receiving of said treatment chemicals under pressure therefrom through said pump conduit means; and
   G. an injector means attached to said injector housing means at said injector outlet means thereon, said injector means adapted to extend outwardly from said injector outlet means and into an automotive exhaust conduit to dispense said treatment chemicals directly into automotive exhaust gases traveling therethrough therein.

2. An apparatus for controlling of automotive exhaust emissions by treatment of exhausting gases traveling through an automotive exhaust conduit as defined in claim 1 wherein said treatment chemicals include:
   A. cyanuric acid;
   B. alcohol; and
   C. limestone.

3. An apparatus for controlling of automotive exhaust emissions by treatment of exhausting gases traveling through an automotive exhaust conduit as defined in claim 2 wherein said limestone is pulverized.

4. An apparatus for controlling of automotive exhaust emissions by treatment of exhausting gases traveling through an automotive exhaust conduit as defined in claim 2 further including tetradecylpyridinium bromide for treatment of diesel emissions.

5. An apparatus for controlling of automotive exhaust emissions by treatment of exhausting gases traveling through an automotive exhaust conduit as defined in claim 1 wherein said reservoir conduit means is made of rubber material.

6. An apparatus for controlling of automotive exhaust emissions by treatment of exhausting gases traveling through an automotive exhaust conduit as defined in claim 1 wherein said fluid pump means comprises an electric fluid pump.

7. An apparatus for controlling of automotive exhaust emissions by treatment of exhausting gases traveling through an automotive exhaust conduit as defined in claim 1 wherein said injector housing means comprises:
   A. a first injector housing positioned adjacent an automotive exhaust conduit to facilitate treatment of exhausting gases traveling therein, said first injector housing defining a first injector inlet means and a first injector outlet means, said first injector inlet means of said first injector housing being in fluid flow communication with respect to said pump conduit means to receive said treatment chemicals therefrom;
   B. a second injector housing positioned adjacent an automotive exhaust conduit to facilitate treatment of exhausting gases traveling therein, said second injector housing defining a second injector inlet means and a second injector outlet means, said second injector inlet means of said second injector housing being in fluid flow communication with respect to said pump conduit means to receive said treatment chemicals therefrom.

8. An apparatus for controlling of automotive exhaust emissions by treatment of exhausting gases traveling through an automotive exhaust conduit as defined in claim 7 wherein said pump conduit means includes:
   A. a y-shaped conduit connector;
   B. an upstream pump conduit extending from said fluid pump means to said y-shaped connector;

C. a first downstream pump conduit extending from said y-shaped conduit connector to said first injector housing to facilitate fluid flow communication between said fluid pump means and said first injector housing; and D. a second downstream pump conduit extending from said y-shaped conduit connector to said second injector housing to facilitate fluid flow communication between said fluid pump means and said second injector housing.

9. An apparatus for controlling of automotive exhaust emissions by treatment of exhausting gases traveling through an automotive exhaust conduit as defined in claim 8 wherein said injector means comprises;

A. a first injector device positioned in said first injector outlet means to facilitate dispensing of said treatment chemicals from said first injector housing into exhausting gases traveling through an automotive exhaust conduit thereadjacent; and B. a second injector device positioned in said second injector outlet means to facilitate dispensing of said treatment chemicals from said second injector housing into exhausting gases traveling through an automotive exhaust conduit thereadjacent.

10. An apparatus for controlling of automotive exhaust emissions by treatment of exhausting gases traveling through an automotive exhaust conduit as defined in claim 1 wherein said injector housing means comprises a plurality of injector housings.

11. An apparatus for controlling of automotive exhaust emissions by treatment of exhausting gases traveling through an automotive exhaust conduit as defined in claim 1 further comprising an injector securement means comprising a clamping strap extending about an automotive exhaust conduit to facilitate securement of said injector housing means thereto.

12. An apparatus for controlling of automotive exhaust emissions by treatment of exhausting gases traveling through an automotive exhaust conduit as defined in claim 11 wherein said injector housing means includes a laterally extending tab means to facilitate securement thereof with respect to an automotive exhaust conduit.

13. An apparatus for controlling of automotive exhaust emissions by treatment of exhausting gases traveling through an automotive exhaust conduit as defined in claim 12 wherein said tab means includes a vertically extending lip means to facilitate securement of said injection housing means with respect to an automotive exhaust conduit by said clamping strap means.

14. An apparatus for controlling of automotive exhaust emissions by treatment of exhausting gases traveling through an automotive exhaust conduit as defined in claim 1 wherein said injector housing means are shaped cylindrically.

15. An apparatus for controlling of automotive exhaust emissions by treatment of exhausting gases traveling through an automotive exhaust conduit as defined in claim 1 wherein said fluid reservoir means further includes a cover means for selectively covering and closing said fluid reservoir inlet means after filling of said treatment chemicals therethrough into said interior chamber means.

16. An apparatus for controlling of automotive exhaust emissions by treatment of exhausting gases traveling through an automotive exhaust conduit as defined in claim 11 wherein said clamping strap is adjustable to be usable with various sizes of injector housing means and various sizes of exhaust conduits.

17. An apparatus for controlling of automotive exhaust emissions by treatment of exhausting gases traveling through an automotive exhaust conduit as defined in claim 1 wherein said fluid reservoir means is adapted to contain at least seven gallons of said treatment chemicals.

18. An apparatus for controlling of automotive exhaust emissions by treatment of exhausting gases traveling through an automotive exhaust conduit as defined in claim 1 wherein said pump conduit means is made of rubber.

19. An apparatus for controlling of automotive exhaust emissions by treatment of exhausting gases traveling through an automotive exhaust conduit comprising:

A. a plurality of treatment chemicals for controlling automotive exhaust emissions, said treatment chemicals being in fluid form and including;
  1. cyanuric acid;
  2. alcohol;
  3. pulverized limestone; and
  4. tetradecylpyridinium bromide;

B. a fluid reservoir means secured with respect to an automobile and defining an interior chamber means therein adapted to hold said treatment chemicals therein to facilitate treatment of automotive exhaust emissions as desired, said fluid reservoir means including a fluid reservoir outlet means adapted to facilitate exiting of said treatment chemicals from said interior chamber means for treatment of automotive exhaust emissions, said fluid reservoir means further defining an fluid reservoir inlet means to facilitate filling of said interior chamber means with said treatment chemicals, said fluid reservoir means further including a cover means for selectively covering and closing said fluid reservoir inlet means and allowing filling of said treatment chemicals therethrough into said interior chamber means;

C. a reservoir conduit means of rubber material and being attached with respect to said fluid reservoir outlet means to be in fluid flow communication with respect to said interior chamber means and adapted to receive said treatment chemicals exiting therefrom;

D. a fluid pump means including a fluid pump inlet and a fluid pump outlet, said fluid pump inlet being attached with respect to said reservoir conduit means to facilitate pumping of said treatment chemicals therefrom and from said interior chamber means of said fluid reservoir means, said fluid pump means including an electric pumping device;

E. a pump conduit means attached with respect to said fluid pump outlet and adapted to receive said treatment chemicals passing therethrough, said pump conduit means further comprising;
  1. a y-shaped conduit connector;
  2. an upstream pump conduit extending from said fluid pump means to said y-shaped connector;
  3. a first downstream pump conduit extending from said y-shaped conduit connector;
  4. a second downstream pump conduit extending from said y-shaped conduit connector;

F. an injector housing means defining therein an interior plenum chamber adapted to receive said treatment chemicals therein to facilitate dispensing thereof, said injector housing means defining an injector inlet means and an injector outlet means to facilitate passing of said treatment chemicals therethrough, said injector inlet means being attached with respect to said pump conduit means to establish fluid flow communication between said injector plenum chamber and said fluid pump means for receiving of said treatment chemicals under pressure therefrom through said pump conduit means, said injector housing means further comprising;

1. a first injector housing being generally cylindrical and positioned adjacent an automotive exhaust conduit to facilitate treatment of exhausting gases traveling therein, said first injector housing defining a first injector inlet means and a first injector outlet means therein, said first injector inlet means of said first injector housing being attached with respect to said first downstream pump conduit to facilitate fluid flow communication of said first injector housing with respect to said pump conduit means and said fluid pump means to receive said treatment chemicals therefrom;

2. a second injector housing being generally cylindrical and positioned adjacent an automotive exhaust conduit to facilitate treatment of exhausting gases traveling therein, said second injector housing defining a second injector inlet means and a second injector outlet means therein, said second injector inlet means of said second injector housing being attached with respect to said second downstream pump conduit to facilitate fluid flow communication of said second injector housing with respect to said pump conduit means and said fluid pump means to receive said treatment chemicals therefrom;

G. an injector means attached to said injector housing means at said injector outlet means thereon, said injector means adapted to extend outwardly from said injector outlet means and into an automotive exhaust conduit to dispense said treatment chemicals directly into the automotive exhaust gases traveling therethrough therein, said injector means further comprising;

1. a first injector device positioned in said first injector outlet means to facilitate dispensing of said treatment chemicals from said first injector housing into exhausting gases traveling through an automotive exhaust conduit thereadjacent;

2. a second injector device positioned in said second injector outlet means to facilitate dispensing of said treatment chemicals from said second injector housing into exhausting gases traveling through an automotive exhaust conduit thereadjacent;

H. a first injector securement means for securing said first injector housing with respect to an exhaust conduit comprising:

1. a laterally extending first tab means fixedly secured with respect to said first injector housing;

2. a vertically extending first lip means adjacent said first tab means;

3. a first clamping strap extending about said first tab means adjacent said first tab means of said first injector housing and about an automotive exhaust conduit to facilitate securement therebetween, said first clamping strap being adjustable; and H. a second injector securement means for securing said second injector housing with respect to an exhaust conduit comprising:

1. a laterally extending second tab means fixedly secured with respect to said second injector housing;

2. a vertically extending second lip means adjacent said second tab means;

3. a second clamping strap extending about said second tab means adjacent said second tab means of said second injector housing and about an automotive exhaust conduit to facilitate securement therebetween, said second clamping strap being adjustable.

* * * * *